United States Patent
Jha et al.

(10) Patent No.: US 9,676,494 B2
(45) Date of Patent: Jun. 13, 2017

(54) COMBINED ANTI-COLLISION AND NAVIGATION LIGHT UNIT AND AIRCRAFT COMPRISING THE SAME

(71) Applicant: Goodrich Lighting Systems GmbH, Lippstadt (DE)

(72) Inventors: Anil Kumar Jha, Lippstadt (DE); Andre Hessling Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 14/661,815

(22) Filed: Mar. 18, 2015

(65) Prior Publication Data
US 2015/0274319 A1    Oct. 1, 2015

(30) Foreign Application Priority Data
Mar. 28, 2014 (EP) .................... 14162222

(51) Int. Cl.
*B64D 47/06* (2006.01)
*F21K 99/00* (2016.01)
*F21K 9/90* (2016.01)
*F21K 9/60* (2016.01)
*F21Y 115/10* (2016.01)

(52) U.S. Cl.
CPC .......... *B64D 47/06* (2013.01); *F21K 9/60* (2016.08); *F21K 9/90* (2013.01); *B64D 2203/00* (2013.01); *F21Y 2115/10* (2016.08); *Y10T 29/49117* (2015.01)

(58) Field of Classification Search
CPC .................................... B64D 47/06
USPC ......................................... 362/470
See application file for complete search history.

(56) References Cited

U.S. PATENT DOCUMENTS

| | | | |
|---|---|---|---|
| 7,402,818 B2* | 7/2008 | Forsyth | F41H 3/00 250/492.1 |
| 2005/0110649 A1* | 5/2005 | Fredericks | B64D 47/06 340/815.45 |
| 2005/0128759 A1* | 6/2005 | Fredericks | B64D 47/06 362/470 |
| 2008/0158012 A1* | 7/2008 | Hagan | B64D 47/06 340/961 |
| 2010/0076615 A1* | 3/2010 | Daniel | F03D 9/00 700/293 |
| 2011/0292302 A1* | 12/2011 | Park | G02B 19/0071 348/739 |

(Continued)

FOREIGN PATENT DOCUMENTS

DE     202004004053 U1   8/2004
EP         2325084 A1    5/2011

OTHER PUBLICATIONS

European Search Report for Application No. 14162222.5-1757, Mailed on Aug. 25, 2014, 6 Pages.

*Primary Examiner* — Renee Chavez
*Assistant Examiner* — Eric T Eide
(74) *Attorney, Agent, or Firm* — Cantor Colburn LLP

(57) ABSTRACT

A combined anti-collision and navigation light unit for an aircraft includes a light source, having at least one LED and having a source-side light intensity distribution, and a lens cover with a shape that is configured to transform the source-side light intensity distribution into an output light intensity distribution of the combined anti-collision and navigation light unit.

11 Claims, 4 Drawing Sheets

(56) References Cited

U.S. PATENT DOCUMENTS

| | | | |
|---|---|---|---|
| 2013/0215598 A1* | 8/2013 | Guzan | D06P 1/0012 362/84 |
| 2013/0265749 A1* | 10/2013 | O'Brien | F21L 4/005 362/184 |
| 2014/0268885 A1* | 9/2014 | Randolph | F21K 9/50 362/650 |

* cited by examiner

COMBINED ANTI-COLLISION AND NAVIGATION LIGHT UNIT AND AIRCRAFT COMPRISING THE SAME

FOREIGN PRIORITY

This application claims priority to European Patent Application No. 14 162 222.5 filed on Mar. 28, 2014, the entire contents of which is incorporated herein by reference.

TECHNICAL FIELD

The present invention relates to exterior lighting systems for aircraft. In particular, it relates to a combined anti-collision and navigation light unit.

BACKGROUND

Almost all aircraft have exterior lights. In particular, large passenger air planes have a wide variety of exterior lights. Examples are navigation lights or position lights, beacon lights, anti-collision lights or strobe lights, wing lights, taxi lights, landing lights, runway turnoff lights, etc. Many of these lights are arranged on the exterior of the aircraft fuselage or on the wings. All of these lights have power requirements and require connections to a power supply. Further, many of these lights must be in locations where they can be seen from many angles, sometimes resulting in light positions that are disadvantageous in terms of the aerodynamics or other design goals of the aircraft.

Accordingly, it would be beneficial to design exterior light units for aircraft that are as little of a constraint for the remainder of the aircraft design as possible. Further, it would be beneficial to provide an aircraft with such improved exterior lighting.

SUMMARY

Exemplary embodiments of the invention include a combined anti-collision and navigation light unit for an aircraft, which comprises a light source, comprising at least one LED and having a source-side light intensity distribution, and a lens cover with a shape that is configured to transform the source-side light intensity distribution into an output light intensity distribution of the combined anti-collision and navigation light unit. The combined anti-collision and navigation light unit is configured to have at least two modes of operation, which comprise a navigation mode of operation, wherein the light source continuously outputs light of a first intensity, and an anti-collision mode of operation, wherein the light source outputs a sequence of light pulses, with a ratio between the second light intensity and the first light intensity having a value of at least 15.

In this way, the functionality of an anti-collision light and a navigation light is combined in one single light unit. Only one light unit has to be provided with power, reducing the overall power consumption and wiring efforts. Further, only one light unit has to be placed on the exterior of the aircraft instead of two separate light units, as implemented in the prior art. In this way, space is saved and the design constraints for the remainder of the aircraft are reduced.

The same light source is operated in both the navigation mode of operation and the anti-collision mode of operation. In both modes of operation, the light from the light source is refracted by the same optical element in the same way, namely by the lens cover. Accordingly, the output light intensity distribution is the same in both modes of operation, only scaled by the different light intensities of the light source. In other words, the optical elements of the combined anti-collision and navigation light unit work in the same way in the navigation mode of operation and the anti-collision mode of operation, with the different functionality being implemented by the different light intensities and the different illumination sequences over time. In yet other words, the light source has the same relative source-side light intensity distribution in both operating modes, and the light unit has the same relative output light intensity distribution in both operating modes. Both the source-side light intensity distribution and the output light intensity distribution scale with the intensity of the light emitted from the light source. With the ratio between the second light intensity and the first light intensity having a value of at least 15, i.e. with the second light intensity being at least 15 times as high as the first light intensity, and with the light emission being pulsed instead of continuous, the anti-collision mode of operation is implemented. Accordingly, the control of the combined anti-collision and navigation light unit decides which kind of light unit functionality the combined anti-collision and navigation light unit assumes at a given point in time.

The term combined anti-collision and navigation light unit refers to a light unit that is configured to function both as an anti-collision light unit and as a navigation light unit. It is integrated in such a way that the same light source is operated in the navigation mode of operation and in the anti-collision mode of operation. Further, the light from the light source is conditioned by the same optical system in both modes of operation. In particular, the light from the light source is passed through and refracted by the lens cover in both modes of operation. In other words, two modes of operation are achieved with the same light source and the same lens cover, i.e. with a single integrated light unit.

The term anti-collision light unit refers to a light unit that flashes in regular intervals. In general, anti-collision lights are very bright and warn other aircraft of an aircraft's position, thus helping to avoid collisions. Anti-collision lights are also referred to as strobe lights. Accordingly, the term anti-collision light unit is intended to encompass strobe light units as well. An anti-collision mode of operation is an operating mode of an anti-collision light unit.

The term navigation light unit refers to a light unit that steadily emits light. In this way, other aircraft or outside observers are able to determine an aircraft's position and moving direction. Navigation lights are also referred to as position lights. Accordingly, the term navigation light unit is intended to encompass position light units as well. A navigation mode of operation is an operating mode of a navigation light unit.

The terms source-side light intensity distribution and output light intensity distribution refer to a spatial relative light intensity distributions. In other words, the terms refers to the relative light intensities of various directions of light emission in relation to one specific light emission direction. This one specific light emission direction may be the direction of the highest light intensity. It may also be a particular geometric direction, such as the direction normal to a mounting plane of the light source or the direction defined by the center of the light source and the point of the lens cover farthest removed from the aircraft, when assembled. The light intensity distributions may be described in terms of angles from the specific light emission direction. In particular, they may be described in terms of angles in a vertical cross-sectional plane and a horizontal cross-sectional plane with respect to the specific light emission direction. Stated differently, the light intensity distributions may consist of relative light intensity values over a particular solid angle. The source-side light intensity distribution and the output light intensity distribution are scaled by the intensity of the light source in operation.

The second light intensity is measured at the respective peaks of the light pulses. The light pulses may have a rectangular form or any other suitable form, such as a sinusoidal form.

According to a particular embodiment, the ratio between the second light intensity and the first light intensity may have a value of between 15 and 25, in particular around 20. The ratio between the second light intensity and the first light intensity may also have a value of at least 20.

According to a further embodiment, the ratio between the second light intensity and the first light intensity is set in such a way that a ratio between an effective light intensity of the light pulses in the anti-collision mode of operation and the first light intensity has a value of at least 15. In this way, the subjective perception of the light intensity in the anti-collision mode of operation is taken into account. The term effective light intensity refers to a calculated light intensity value that takes into account the brightness perception of light flashes. In particular, the effective light intensity may take into account the light intensity course over time and the duration of the light pulses. In particular, the effective light intensity of a light flash that lasts from t1 to t2 may be calculated by the Blondel Rey equation, which is $$I_e = \frac{\int_{t_1}^{t_2} I(t)\,dt}{0.2 + (t_2 - t_1)},$$

with $I_e$ denoting the effective light intensity and $I(t)$ denoting the course of light intensity over time during the light flash. The effective light intensity may also be calculated with other suitable equations that take into account the perceived light intensity of a light pulse.

According to a particular embodiment, the ratio between the second light intensity and the first light intensity may have a value of between 30 and 50, in particular between 35 and 45, further in particular around 40. The ratio between the second light intensity and the first light intensity may also have a value of at least 40.

According to a particular embodiment, the ratio between the effective light intensity of the light pulses in the anti-collision mode of operation and the first light intensity may have a value of between 15 and 25, in particular of around 20. The ratio between the effective light intensity of the light pulses in the anti-collision mode of operation and the first light intensity may also have a value of at least 20.

An illustrative example of the application of the Blondel Rey equation is as follows. For rectangular light pulses having a duration of 200 ms and having a second light intensity of 40 times the first light intensity, the effective light intensity is 20 times the first light intensity.

According to a further embodiment, the lens cover has such a shape that the output light intensity distribution satisfies a predefined anti-collision mode light intensity distribution in the anti-collision mode of operation and a predefined navigation mode light intensity distribution in the navigation mode of operation. In other words, the lens cover refracts the light from the light source in such a way that the light, when output from the light unit, satisfies both a predefined anti-collision mode light intensity distribution and a predefined navigation mode light intensity distribution. The expression of the output light intensity distribution satisfying a particular light intensity distribution refers to the situation where the output light intensity distribution is in conformity with the requirements posed by the particular light intensity distribution. Both the predefined anti-collision mode light intensity distribution and the predefined navigation mode light intensity distribution comprise a set of minimum light intensity values for particular light emission directions. In this context, the term satisfying a particular light intensity distribution refers to the exceeding of said set of minimum light intensity values by the output light intensity distribution. In addition, it is also possible that one or both of the predefined anti-collision mode light intensity distribution and the predefined navigation mode light intensity distribution comprise a set of maximum light intensity values for particular light emission directions. In this case, the term satisfying a particular light intensity distribution refers to the output light intensity distribution being below said set of maximum light intensity values for the given directions.

The output light intensity distribution is a relative light intensity distribution whose shape is the same in all modes of operation. The absolute light intensity distribution emitted by the light unit is the output light intensity distribution multiplied by a scaling factor. This scaling factor depends on the intensity of the light source in the respective mode of operation. Accordingly, it can also be said that the lens cover has such a shape that the output light intensity distribution, multiplied by a first scaling factor of the navigation mode of operation, satisfies the predefined navigation mode light intensity distribution, and that the output light intensity distribution, multiplied by a second scaling factor of the anti-collision mode of operation, satisfies the predefined anti-collision mode light intensity distribution. The first and second scaling factors are a function of the first and second intensities, respectively. In particular, the ratio between the first and second scaling factors is the same as the ratio between the first and second intensities.

In this way, the combined anti-collision and navigation light unit is adapted to conform with desired light intensity distributions in both modes of operation. The terms predefined anti-collision mode light intensity distribution and predefined navigation mode light intensity distribution refer to light intensity distributions that are set in the design phase of the light unit. The predefined light intensity distributions may therefore also be referred to as desired or set light intensity distributions. The predefined light intensity distributions may be the result of design consideration and/or may be the result of regulatory constraints.

According to a further embodiment, the lens cover has such a shape that the output light intensity distribution satisfies both a predefined anti-collision mode light intensity distribution and a predefined navigation mode light intensity distribution, when scaled to a normalized peak intensity. In other words, when the predefined anti-collision mode light intensity distribution and the predefined navigation mode light intensity distribution are scaled to a normalized peak intensity, i.e. scaled in such a way that their peak intensities are the same, the output light intensity distribution has a shape that conforms with both predefined light intensity distributions. In yet other words, when the predefined anti-collision mode light intensity distribution and the predefined navigation mode light intensity distribution are scaled to a normalized peak intensity, the output light intensity distribution has a shape that exceeds the minimum light intensity requirements of the predefined anti-collision mode light intensity distribution and the predefined navigation mode light intensity distribution and that, if applicable, is below the maximum light intensity requirements of the predefined anti-collision mode light intensity distribution and the predefined navigation mode light intensity distribution. In this way, the output light intensity distribution is in compliance with the relatively more restrictive requirements of both the predefined anti-collision mode light intensity distribution and the predefined navigation mode light intensity distribution for all emission directions. In other words, for all angles/portions of the output light intensity distribution, the output light intensity distribution satisfies a compound light intensity distribution resulting from a combination of the predefined anti-collision mode light intensity distribution and the predefined navigation mode light intensity distribution, when scaled to a normalized peak intensity. In this way, the combined anti-collision and navigation light unit allows for operation in the navigation mode of operation and the anti-collision mode of operation with minimum power requirements. No excessive over-fulfilling of the predefined light intensity distributions in either of the two modes of operation takes place.

The term peak intensity refers to the intensity in the direction of highest light intensity for the output light intensity distribution.

According to a further embodiment, the value of the ratio between the second light intensity and the first light intensity corresponds substantially to the ratio between a peak intensity of the predefined anti-collision mode light intensity distribution and a peak intensity of the predefined navigation mode light intensity distribution. By establishing a correspondence between the peak intensities of the predefined anti-collision mode and navigation mode light intensity distributions and the first and second light intensities of the light source, the control of the light unit ensures that the light intensities output by the light unit fulfil the desired light intensities for both modes of operation, while consuming a low amount of power. In other words, the power consumption may be minimized under the condition that two predefined light intensity distributions in two operating modes are fulfilled with one single light unit. It is not necessary that the ratio between the second light intensity and the first light intensity equals the ratio between a peak intensity of the predefined anti-collision mode light intensity distribution and a peak intensity of the predefined navigation mode light intensity distribution. While this may lead to an optimum power consumption for particular application scenarios, the advantage of reaching a low power consumption are already achieved when the ratios substantially correspond to each other. The term substantially corresponds may refer to the situation where the ratio between the second light intensity and the first light intensity is within a range of 90% and 110%, in particular within a range of 95% and 105%, of the ratio between the peak intensity of the predefined anti-collision mode light intensity distribution and the peak intensity of the predefined navigation mode light intensity distribution. The second light intensity may be between 15 and 20 times as high as the first light intensity, in particular around 20 times as high.

In an alternative embodiment, the value of the ratio between the second light intensity and the first light intensity may correspond substantially to the ratio between a peak intensity of the predefined anti-collision mode light intensity distribution and a peak intensity of the predefined navigation mode light intensity distribution, multiplied by a correction factor, which correction factor takes into account a perceived intensity of the light pulses. The correction factor may depend on the length of the light pulses and/or on their pulse shape over time. In this way, the perceived intensity of the light pulses in the anti-collision mode of operation may be brought into conformity with the desired or required design goals. An option for calculating said correction factor is the so-called Blondel Rey equation, discussed above. The resulting correction factor allows for adapting the perceived light intensity to the design goals. Above discussed aspects with respect to power consumption and substantially corresponding ratios is equally applicable to this alternative embodiment. The second light intensity may be between 30 to 50 times as high as the first light intensity, in particular around 40 times as high, depending on the length and the shape of the light pulses in the anti-collision mode of operation.

According to a further embodiment, the predefined anti-collision mode light intensity distribution and the predefined navigation mode light intensity distribution are in accordance with respective Federal Aviation Regulations (FAR). In particular, the predefined anti-collision mode light intensity distribution may be in accordance with FAR25.1401. Further in particular, the predefined navigation mode light intensity distribution may be in accordance with FAR25.1387 and/or FAR25.1389 and/or FAR25.1391 and/or FAR25.1393. In this way, the combined anti-collision and navigation light unit satisfies both the FAR requirements for anti-collision lights and for navigation lights.

According to a further embodiment, the lens cover has continuous inner and outer surfaces and has such a shape that the output light distribution is an envelope curve enveloping a compound light intensity distribution resulting from a combination of the predefined anti-collision mode light intensity distribution and the predefined navigation mode light intensity distribution, when scaled to a normalized peak intensity. The term envelope curve refers to a differentiable curve or surface, which connects a plurality of discrete light intensity values in a continuous manner. With the output light intensity distribution being a differentiable curve or surface and the source-side light intensity distribution being generally of differentiable nature, the lens cover can achieve the transformation of the source-side light intensity distribution into the output light intensity distribution with continuous inner and outer surfaces. In this way, the lens cover may easier to handle, e.g. easier to clean, and easier to produce.

According to a further embodiment, the output light intensity distribution exceeds both the predefined anti-collision mode light intensity distribution and the predefined navigation mode light intensity distribution, when scaled to the normalized peak intensity, for all emission directions in a vertical cross-sectional plane. In other words, both the predefined anti-collision mode light intensity distribution and the predefined navigation mode light intensity distribution only consist of required minimum values, which the output light intensity distribution exceeds in the respective mode of operation. The term exceeding encompasses both an exact fulfilling of a requirement and an exceeding of a requirement by some margin. The emission directions in the vertical cross-sectional plane can be defined as going from −90° to +90° with respect to the horizontal direction. In this way, it can be ensured that the requirements in the vertical cross-sectional plane, which are important for both anti-collision light and navigation light functionality, are fulfilled.

According to a further embodiment, the lens cover has such a shape that no light is emitted in operation at an angle of more than 70° with respect to the principal light emission direction in a horizontal plane. The principal light emission direction may be defined as the intersection between the horizontal cross-sectional plane and the vertical cross-sectional plane through the light source, in particular through the center of the light source. In this way, the combined anti-collision and navigation light unit may satisfy a requirement of particular navigation light applications, which do not allow a horizontal opening angle of more than 140°. This sharp cut-off at +70° and −70° with respect to the principal light emission direction may be achieved in any suitable manner. An example is a chamfer surface in the lens cover, which directs light in the undesired angular range either towards desired ranges or towards the aircraft body for being absorbed or reflected into desired ranges.

According to a further embodiment, the space between the light source and the lens cover is free of shutters. In this way, the total luminous flux of the light source may be used, leading to high energy efficiency of the light unit. In addition, the space between the light source and the lens cover may also be free of reflectors, lenses or other optical elements. The lens cover may be the only optical element contributing to the shaping of the output light intensity distribution.

According to a further embodiment, the output light distribution has a peak intensity of more than 300 cd, in particular of at least 400 cd in the anti-collision mode of operation. The output light distribution may also have a peak intensity of more than 600 cd, in particular of at least 800 cd in the anti-collision mode of operation. In this case, the effective intensity of the light pulses may be more than 300 cd, in particular more than 400 cd.

According to a further embodiment, the output light distribution has a peak intensity of more than 15 cd, in particular of at least 20 cd in the navigation mode of operation.

According to a further embodiment, the light source consists of exactly one LED. In this way, a highly energy-efficient and space-efficient light unit is achieved. LED's have an extremely high luminous flux per supplied power. Moreover, the one LED allows for the implementation of a simple control for achieving the different light intensities, as explained below.

According to a further embodiment, the first light intensity, i.e. the light intensity of the light source in the navigation mode of operation, and the second light intensity, i.e. the peak light intensity in the anti-collision mode of operation, are generated by respective levels of an illumination current through the light source. The first light intensity is generated by a first level of the illumination current, while the second light intensity is generated by a second level of the illumination current. In other words, the current through the light source is controlled in such a way that the light source outputs light of the first intensity in the navigation mode of operation and that the light source outputs light of the second light intensity during the light pulses in the anti-collision mode of operation. With respect to LED's, the current through the LED is determinative of the intensity emitted by the LED. Accordingly, the intensity may be easily controlled by the current. The first level of the illumination current corresponds to a dimmed operation of the light source as compared to the second level of the illumination current.

According to a further embodiment, the combined anti-collision and navigation light unit is further configured to have a combined mode of operation, wherein the light source outputs a sequence of light pulses, with the light pulses having the second light intensity, and wherein the light source outputs light of the first light intensity between the light pulses. In this way, the combined anti-collision and navigation light unit may also function like the combination of an anti-collision light unit and a navigation light unit disposed next to each other and operating at the same time.

According to a further embodiment, the light pulses have a length of between 100 ms and 300 ms, in particular of around 200 ms.

According to a further embodiment, the light source emits white light in operation. In this way, the combined anti-collision and navigation light unit is ideally suited to replace the tail navigation light and the tail anti-collision light of an aircraft, because the tail navigation light is often required to emit white light. The lens cover may be fully transparent, passing the white light.

Exemplary embodiments of the invention further include an aircraft comprising at least one combined anti-collision and navigation light unit, as described in accordance with any of the embodiments above. In a particular embodiment, the aircraft may comprise a combined anti-collision and navigation light unit, as described in accordance with any of the embodiments above, attached to the tail of the aircraft.

Exemplary embodiment of the invention further include a method or replacing a used anti-collision light unit and a used navigation light unit with a combined anti-collision and navigation light unit, as described in any of the embodiments above, in an aircraft, the method comprising the steps of disconnecting the used anti-collision light unit from a power supply, disconnecting the used navigation light unit from the power supply, and connecting the combined anti-collision and navigation light unit, as described in any of the embodiments above, to the power supply. In this way, the advantages of the invention can be extended to existing aircraft. Above discussed modifications and advantages equally apply to the method of replacement.

BRIEF DESCRIPTION OF THE DRAWINGS

Exemplary embodiments of the invention are described in greater detail below with reference to the Figs., wherein.

DETAILED DESCRIPTION

Figure 1:
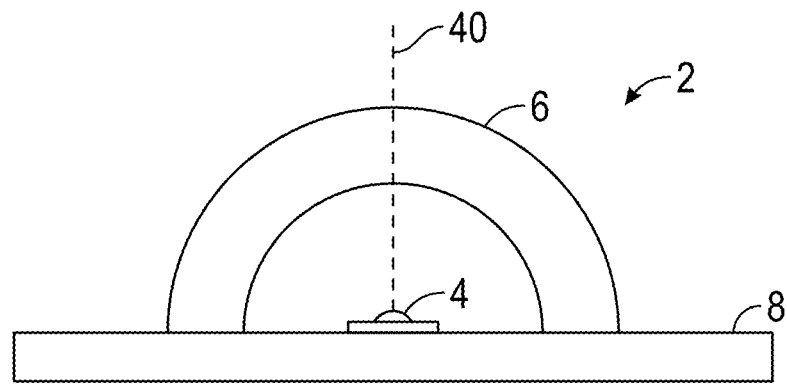
FIG. 1 shows a schematic cross-sectional view of an exemplary embodiment of a combined anti-collision and navigation light unit in accordance with the invention.

FIG. 1 is a schematic view of a combined anti-collision and navigation light unit 2 in accordance with an exemplary embodiment of the invention. The drawing plane of FIG. 1 is a vertical cross-section through the combined anti-collision and navigation light unit 2, with the cross-sectional plane running through the center of the light source 4.

The combined anti-collision and navigation light unit 2 comprises a light source 4, a lens cover 6, and a mounting structure 8. Further elements, such as the circuitry supplying electrical power to the light source 4, are present, as is apparent to the skilled person. Such additional elements are omitted throughout the Figs. for a better understanding of the invention.

The light source 4 is a single LED. The LED 4 is mounted to the mounting structure 8. In particular, the LED 4 is mounted to the mounting structure 8 in a plane manner. The LED 4 is a generally available LED having a Gaussian or Lambertian light intensity distribution. As such, the LED 4 has its principal light emission direction, i.e. its emission direction with the highest relative light intensity, normal to the mounting structure 8. The principal light emission direction is denoted with reference numeral 40. When assembled to an aircraft, the principal light emission direction 40 may generally correspond to a horizontal direction, i.e. to a direction that is parallel to the floor when the aircraft is in on the ground. In particular embodiments, the principal light emission direction 40 may be generally parallel to the longitudinal direction of the aircraft fuselage.

The lens cover 6 is disposed over the LED 4 and is also mounted to the mounting structure 8. It has the general structure of a hollow semi-sphere, which creates an enclosed space between the LED 4 and the lens cover 6 above the mounting structure 8. In the schematic representation of FIG. 1, both the inner surface and the outer surface of the lens cover 6 are spherical. However, according to the invention, at least one of the inner surface and the outer surface of the lens cover 6 is non-spherical, as will be explained below. In many applications, both the inner surface and the outer surface of the lens cover 6 are non-spherical. The particular shapes of the inner surface and the outer surface effect a transformation of light intensity distribution as output by the LED 4, i.e. of the source-side light intensity distribution, into a light intensity distribution as output by the combined anti-collision and navigation light unit 2, i.e. into the output light intensity distribution. The particular nature of the output light intensity distribution will be explained below.

Figure 2:
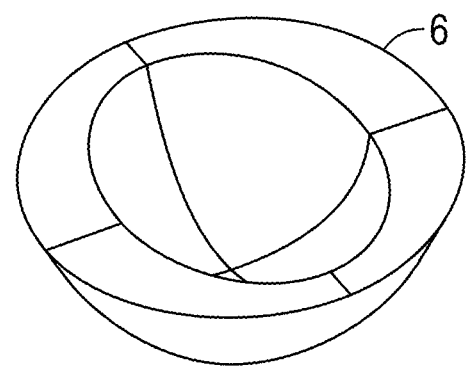
FIG. 2 shows a perspective view of the lens cover of the combined anti-collision and navigation light unit of FIG. 1.

In FIG. 2, a perspective view of the lens cover 6 is provided, showing mostly the underside of the lens cover 6, where the mounting surface for mounting to the mounting structure 8 and the inner surface of the lens cover 6 can be seen. From the contours of the mounting surface/lower surface, it is apparent that at least the inner contour thereof is not circular and that the lens cover 6 has a varying thickness. These features are a means of having an optical effect on the source-side light intensity distribution and allowing for a transformation thereof, when the light passes through the lens cover 6. The lens cover 6 refracts the light from the LED 6 and thus creates the output light intensity distribution, discussed below.

Figure 3A:
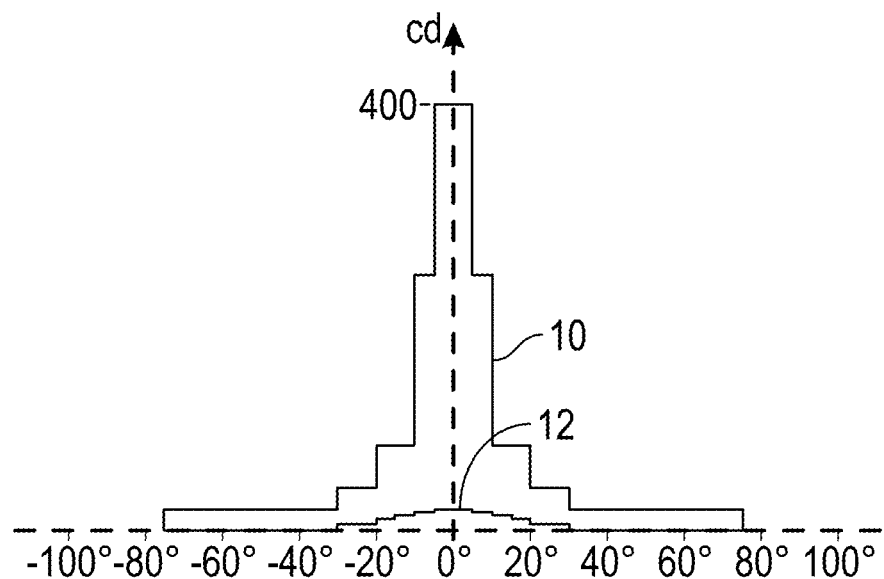
FIG. 3a is a cross-section through an exemplary predefined anti-collision mode light intensity distribution and an exemplary predefined navigation mode light intensity distribution in a vertical plane.

FIG. 3a shows an exemplary embodiment of a predefined anti-collision mode light intensity distribution 10 and an exemplary embodiment of a predefined navigation mode light intensity distribution 12 in a vertical cross-sectional plane, which vertical cross-sectional plane incorporates the principal light emission direction 40 of the LED 4. The light intensity distributions 10 and 12 are given in terms of angles with respect to the principal light emission direction 40, i.e. with respect to the horizontal direction in use.

The predefined anti-collision mode light intensity distribution and the predefined navigation mode light intensity distribution are required light intensity distributions for an anti-collision light and a navigation light, respectively, according to Federal Aviation Regulations (FAR). The depicted course of the light intensity distributions indicates minimum values in accordance with the FAR. Accordingly, for an anti-collision light or a navigation light to be in accordance with the respective FAR requirements, the output light intensity distributions must be above the shown course for all angles.

The exemplary predefined anti-collision mode light intensity distribution 10 requires the following minimum light intensity values in the vertical cross-sectional plane. A light intensity of 400 cd is required for a range between +5° and −5° with respect to the horizontal. A light intensity of 240 cd is required for a range between +/−5° and +/−10° with respect to the horizontal. A light intensity of 80 cd is required for a range between +/−10° and +/−20° with respect to the horizontal. A light intensity of 40 cd is required for a range between +/−20° and +/−30° with respect to the horizontal. A light intensity of 20 cd is required for a range between +/−30° and +/−75° with respect to the horizontal. These required values may be absolute values or effective light intensity values which take into account the observer's perception, as discussed above.

The exemplary predefined navigation mode light intensity distribution 12 requires the following minimum light intensity values in the vertical cross-sectional plane. A light intensity of 20 cd is required in the principal light emission direction, i.e. in the horizontal. A light intensity of 18 cd is required for a range between 0° and +/−5° with respect to the horizontal. A light intensity of 16 cd is required for a range between +/−5° and +/−10° with respect to the horizontal. A light intensity of 14 cd is required for a range between +/−10° and +/−15° with respect to the horizontal. A light intensity of 10 cd is required for a range between +/−15° and +/−20° with respect to the horizontal. A light intensity of 6 cd is required for a range between +/−20° and +/−30° with respect to the horizontal. A light intensity of 2 cd is required for a range between +/−30° and +/−40° with respect to the horizontal. A light intensity of 1 cd is required for a range between +/−40° and +/−90° with respect to the horizontal.

Figure 3B:
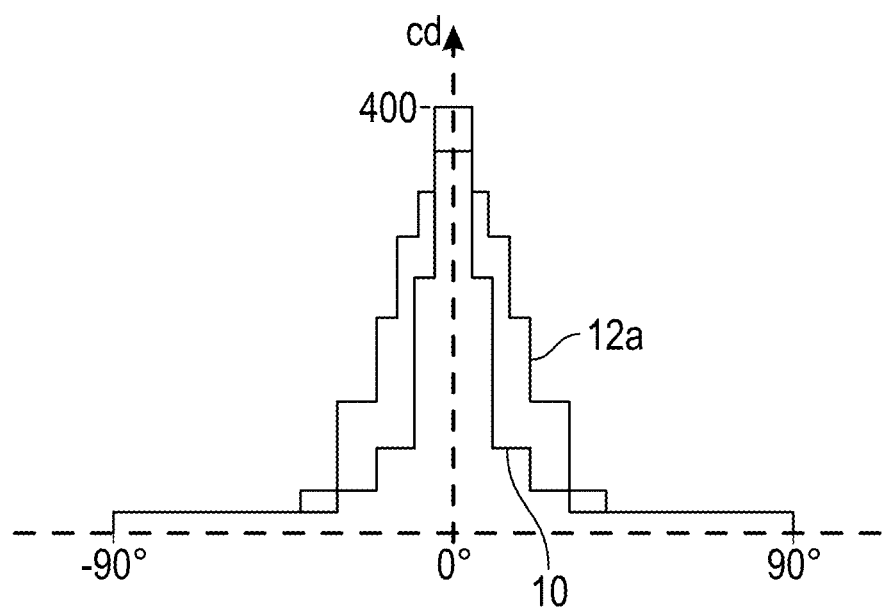
FIG. 3b shows the exemplary light intensity distributions of FIG. 3a, scaled to a normalized peak intensity.

FIG. 3b shows the predefined anti-collision mode light intensity distribution and the predefined navigation mode light intensity distribution of FIG. 3a, scaled to a normalized peak intensity. In particular, the predefined anti-collision mode light intensity distribution 10 of FIG. 3b is the same as in FIG. 3a.

However, the scaled version 12a of the predefined anti-collision mode light intensity distribution 12 is the predefined navigation mode light intensity distribution 12 of FIG. 3a multiplied by the factor 20. The factor 20 stems from the fact that the peak intensity of the predefined anti-collision mode light intensity distribution 10 is 20 times as high as the peak intensity of the predefined navigation mode light intensity distribution 12. As can be seen from FIG. 3b, the predefined anti-collision mode light intensity distribution 10 and the scaled version 12a of the predefined navigation mode light intensity distribution 12 have the same peak intensity of 400 cd.

Figure 3C:
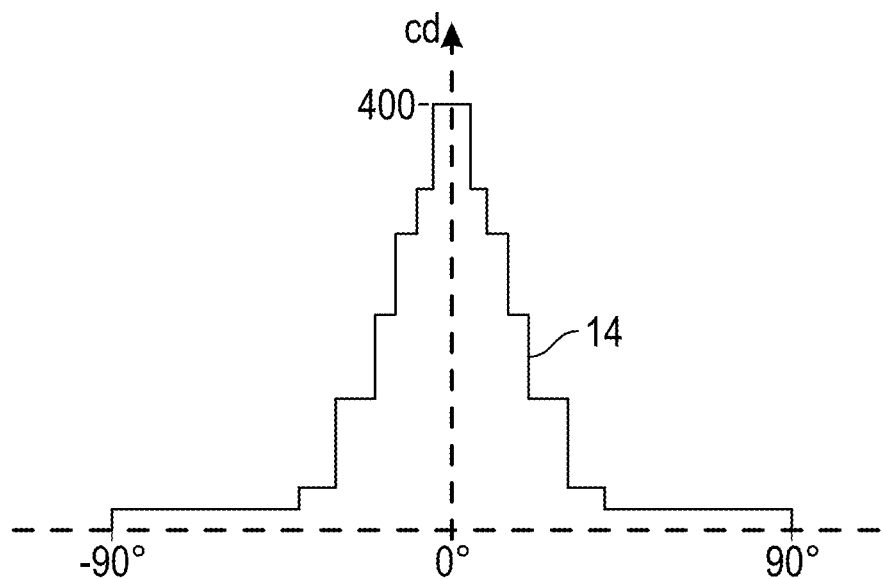
FIG. 3c shows an exemplary compound light intensity distribution, resulting from the scaled light intensity distributions of FIG. 3b.

In FIG. 3c, a compound light intensity distribution 14 is shown, which is the result of a combination of the predefined anti-collision mode light intensity distribution 10 and the scaled version 12a of the predefined navigation mode light intensity distribution 12. The compound light intensity distribution 14 is derived from the light intensity distributions 10 and 12a in such a way that the more restrictive requirement of the two light intensity distributions is chosen for each angle. In other words, the compound light intensity distribution 14 is derived by tracing the respectively upper one of the two light intensity distributions 10 and 12a along the angular axis. This compound light intensity distribution 14 has a very particular property. If a light unit emits light with the compound light intensity distribution 14, said light unit satisfies the FAR requirements for an anti-collision light. Moreover, if a light unit emits the compound light intensity distribution 14, with the intensity values over all angles being divided by 20, the light unit satisfies the FAR requirements for a navigation light. Accordingly, the compound light intensity distribution 14 has a shape that, when scaled properly, satisfies both the predefined anti-collision mode light intensity distribution 10 and the predefined navigation mode light intensity distribution 12. In other words, the compound light intensity distribution 14 is an example of a relative output light intensity distribution that is suitable for both an anti-collision light and a navigation light according to the FAR.

Based on these consideration, the lens cover 6 has such a shape that it transforms the portion or Lambertian light intensity distribution of the LED 4 into a relative output light intensity distribution that satisfies the relative requirements of the compound light intensity distribution 14. The satisfaction of the absolute predefined anti-collision mode light intensity distribution 10 and the predefined navigation mode light intensity distribution 12 is then achieved via a scaling of the light intensity output by the LED 4. This light intensity is in turn controlled by the illumination current flown through the LED 4 in operation.

Figure 3D:
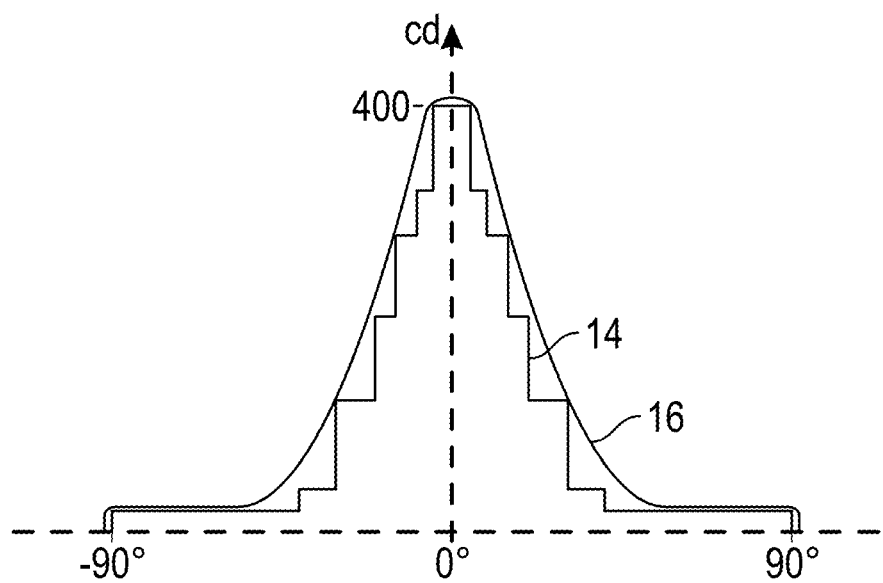
FIG. 3d shows an exemplary envelope curve over the compound light intensity distribution of FIG. 3c.

In FIG. 3d, an envelope curve 16 is shown over the compound light intensity distribution 14. The envelope curve 16 also has a shape that, when scaled properly, satisfies both the predefined anti-collision mode light intensity distribution 10 and the predefined navigation mode light intensity distribution 12. Accordingly, the envelope curve 16 is another example of a relative light output intensity distribution that is suitable for both an anti-collision light and a navigation light according to the FAR. The envelope curve 16 is a continuous, differentiable curve. In this way, it is a very suitable target curve for the output light intensity distribution. With the LED 4 having a Gaussian or Lambertian light intensity distribution, both the source-side light intensity distribution and the envelope curve 16 are continuous, differentiable curves. Starting from the light intensity distribution of the LED 4 and the envelope curve 16, it is possible to provide a shape for the lens cover 6 that is also continuous and that achieves the transformation of the source-side light intensity distribution into the envelope curve 16. It is known to the skilled person how to exactly calculate and provide the shape of the lens cover that achieves said transformation. The lens cover 6 of FIG. 2 has a shape that achieves the transformation of the source-side light intensity distribution into the output light intensity distribution along the envelope curve.

FIG. 4 shows three light intensity sequences over time, implementing a navigation mode of operation, an anti-collision mode of operation, and a combined mode of operation. The shown light intensity values are the light intensity values in the principal light emission direction of the combined anti-collision and navigation light unit. With respect to the light intensity distributions of FIG. 3, which show the distributions in the vertical plane, the intensity value at the angle of 0° is shown. In other words, the intensity values shown in FIG. 4 are the light intensities emitted by the combined anti-collision and navigation light unit in a horizontal direction.

Figure 4A:
FIGS. 4a, 4b and 4c show exemplary courses of a light intensity of the combined anti-collision and navigation light unit in a principal light emission direction over time in various modes of operation.

FIG. 4a shows a first light intensity course 20 over time. The first light intensity course 20 has a constant value of 20 cd. In this way, the first light intensity course is in accordance with the requirements of the navigation mode of operation, which requires a continuous output of light. Also, the value of 20 cd is in accordance with the peak value of the predefined navigation mode light intensity distribution 12, shown in FIG. 3a.

Figure 4B:
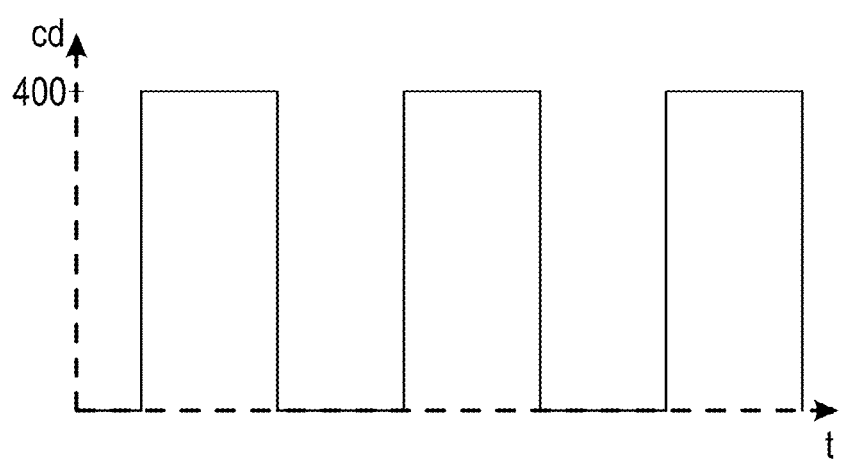

FIG. 4b shows a second light intensity course 22 over time. The second light intensity course 22 has a pulsed shape. It comprises a sequence of equally high, equally long pulses that are separated by intervals of no light being emitted. In this way, the second light intensity course is in accordance with the requirements of the anti-collision mode of operation, which requires a sequence of light pulses, also referred to as a sequence of light flashes or a strobe operation. In the exemplary embodiment of FIG. 4b, the pulses are rectangular pulses. The intervals of no light being emitted are as long as the pulse lengths. The pulse shape, the pulse length, and the length between the pulses may have any suitable form/value. The light intensity value of 400 cd, which is present during the pulses, is in accordance with the peak value of the predefined anti-collision mode light intensity distribution 10, shown in FIG. 3a.

Figure 4C:
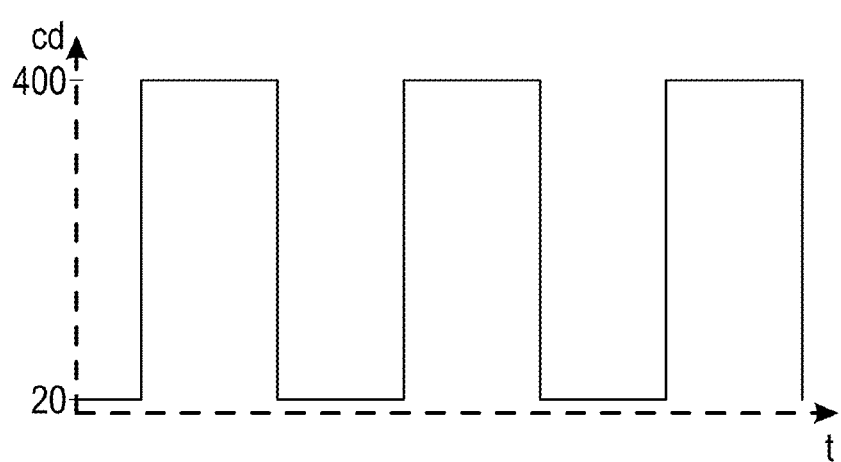

FIG. 4c shows a third light intensity course 24 over time. The third light intensity course is a combination of the first light intensity course 20 and the second light intensity course 22 in such a way that the light intensity values along the third light intensity course 24 correspond to the respectively higher value of the first light intensity course 20 and the second light intensity course 22. In particular, the pulses of the third light intensity course 24 correspond to the pulses of the second light intensity course 22. However, during the intervals between the pulses, the light intensity of the third light intensity course 24 is at 20 cd. In this way, the light intensity between the pulses corresponds to the continuous light intensity of the first light intensity course 20. As a minimum light intensity of 20 cd is ensured at all times in the third light intensity course 24, the combined mode satisfies the FAR requirements for a navigation light. Further, with the light pulses having a light intensity of 400 cd, the combined mode also satisfies the FAR requirements for an anti-collision light.

As compared to the provision of separate anti-collision and navigation lights that operate at the same time, the combined mode illustrated in FIG. 4c is more power-efficient. This is because a mere addition of the light intensities of FIG. 4a and FIG. 4b would result in a higher than necessary light intensity during the pulses, namely a light intensity of 420 cd. In this way, the combined anti-collision and navigation light unit saves power.

The light intensity during the pulses of the second light intensity course 22 and the third light intensity course 24 is subject to various considerations. On the one hand, the light intensity may be right in accordance with the desired light intensity distribution. This is shown in FIG. 4 with respect to the exemplary predefined anti-collision mode light intensity distribution of FIGS. 3a and 3b and the exemplary compound light intensity distribution of FIG. 3c. On the other hand, the light intensity value may be scaled to account for the different perceptions of light pulses of different lengths. The correction factor may be calculated with the Blondel Rey equation, known to the skilled person. An illustrative example is given as follows. Light pulses with a length of 200 ms are perceived with a lower light intensity. In particular, the Blondel Rey equation says that a pulse of 200 ms is perceived half as bright as its actual intensity value. Accordingly, in an exemplary embodiment, the light pulses of FIGS. 4b and 4c may have a length of 200 ms and may have a light intensity value of 800 cd.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Combined anti-collision and navigation light unit for an aircraft, comprising:
 a light source, comprising at least one LED and having a light output, and
 a lens cover with a shape that is configured to transform the light output of the light source into an output light intensity distribution of the combined anti-collision and navigation light unit,
 wherein the combined anti-collision and navigation light unit is configured to have at least two modes of operation, which comprise:
  a navigation mode of operation, wherein the light source continuously outputs light of a first intensity, and
  an anti-collision mode of operation, wherein the light source outputs a sequence of light pulses, with the light pulses having a second light intensity, with a ratio between the second light intensity and the first light intensity having a value of at least 15,
 wherein the output light intensity distribution has a peak intensity of more than 400 cd in the anti-collision mode of operation and wherein the output light intensity distribution has a peak intensity of more than 20 cd in the navigation mode of operation, and
 wherein the light source consists of exactly one LED,
 wherein the lens cover has such a shape that the output light intensity distribution satisfies a predefined anti-collision mode light intensity distribution in the anti-collision mode of operation and a predefined navigation mode light intensity distribution in the navigation mode of operation,
 wherein, in a vertical cross-sectional plane, the predefined anti-collision light intensity distribution has a light intensity of:
  at least 400 cd in a range between +5° and −5° with respect to a horizontal direction,
  at least 240 cd in a range between +5° and +10° and between −5° and −10° with respect to the horizontal direction,
  at least 80 cd in a range between +10° and +20° and between −10° and −20° with respect to the horizontal direction,
  at least 40 cd in a range between +20° and +30° and between −20° and −30° with respect to the horizontal direction, and
  at least 20 cd in a range between +30° and +75° and between −30° and −75° with respect to the horizontal direction,
 wherein, in the vertical cross-sectional plane, the predefined navigation mode light intensity distribution has a light intensity of:
  at least 20 cd in the horizontal direction,
  at least 18 cd in a range between +5° and −5° with respect to a horizontal direction,
  at least 16 cd in a range between +5° and +10° and between −5° and −10° with respect to the horizontal direction,
  at least 14 cd in a range between +10° and +15° and between −10° and −15° with respect to the horizontal direction,
  at least 10 cd in a range between +15° and +20° and between −15° and −20° with respect to the horizontal direction,
  at least 6 cd in a range between +20° and +30° and between −20° and −30° with respect to the horizontal direction,
  at least 2 cd in a range between +30° and +40° and between −30° and −40° with respect to the horizontal direction, and
  at least 1 cd in a range between +40° and +90° and between −40° and −90° with respect to the horizontal direction.

2. Combined anti-collision and navigation light unit according to claim 1, wherein the ratio between the second light intensity and the first light intensity is set in such a way that a ratio between an effective light intensity of the light pulses in the anti-collision mode of operation and the first light intensity has a value of at least 15,
 wherein the effective light intensity is calculated in accordance with the Blondel Rey equation.

3. Combined anti-collision and navigation light unit according to claim 1, wherein the lens cover has such a shape that the output light intensity distribution satisfies both the predefined anti-collision mode light intensity distribution and the predefined navigation mode light intensity distribution, when scaled to a normalized peak intensity.

4. Combined anti-collision and navigation light unit according to claim 3, wherein the value of the ratio between the second light intensity and the first light intensity corresponds substantially to the ratio between a peak intensity of the predefined anti-collision mode light intensity distribution and a peak intensity of the predefined navigation mode light intensity distribution, or
 wherein the value of the ratio between the second light intensity and the first light intensity corresponds substantially to the ratio between a peak intensity of the predefined anti-collision mode light intensity distribution and a peak intensity of the predefined navigation mode light intensity distribution, multiplied by a correction factor, which takes into account a subjective perception of the light pulses.

5. Combined anti-collision and navigation light unit according to claim 1, wherein the lens cover has continuous inner and outer surfaces and has such a shape that the output light distribution is an envelope curve enveloping a compound light intensity distribution resulting from a combination of the predefined anti-collision mode light intensity distribution and the predefined navigation mode light intensity distribution, when scaled to a normalized peak intensity.

6. Combined anti-collision and navigation light unit according to claim 1, wherein the output light intensity distribution exceeds both the predefined anti-collision mode light intensity distribution and the predefined navigation mode light intensity distribution, when scaled to the normalized peak intensity, for all emission directions in the vertical cross-sectional plane.

7. Combined anti-collision and navigation light unit according to claim 1, wherein the first light intensity and the second light intensity are generated by respective levels of an illumination current through the light source.

8. Combined anti-collision and navigation light unit according to claim 1, wherein the combined anti-collision and navigation light unit is further configured to have a combined mode of operation, wherein the light source outputs a sequence of light pulses, with the light pulses having the second light intensity, and
    wherein the light source outputs light of the first light intensity between the light pulses.

9. Aircraft comprising at least one combined anti-collision and navigation light unit according to claim 1.

10. The aircraft of claim 9, wherein the light unit is attached to the tail of the aircraft.

11. Method for replacing a used anti-collision light unit and a used navigation light unit with a combined anti-collision and navigation light unit in accordance with claim 1 in an aircraft, the method comprising the steps of:
    disconnecting the used anti-collision light unit from a power supply,
    disconnecting the used navigation light unit from the power supply, and
    connecting the combined anti-collision and navigation light unit according to of claim 1 to the power supply.

\* \* \* \* \*